United States Patent
Paul et al.

(10) Patent No.: US 11,663,449 B2
(45) Date of Patent: May 30, 2023

(54) PARSING REGULAR EXPRESSIONS WITH SPIKING NEURAL NETWORKS

(71) Applicant: Intel Corporation, Santa Clara, CA (US)

(72) Inventors: Arnab Paul, Hillsboro, OR (US); Narayan Srinivasa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 414 days.

(21) Appl. No.: 16/648,169

(22) PCT Filed: Dec. 15, 2017

(86) PCT No.: PCT/US2017/066776
§ 371 (c)(1),
(2) Date: Mar. 17, 2020

(87) PCT Pub. No.: WO2019/117956
PCT Pub. Date: Jun. 20, 2019

(65) Prior Publication Data
US 2020/0265290 A1 Aug. 20, 2020

(51) Int. Cl.
*G06F 16/00* (2019.01)
*G06N 3/049* (2023.01)
*G06N 3/08* (2023.01)

(52) U.S. Cl.
CPC ............. *G06N 3/049* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 2005/0076084 A1 | 4/2005 | Loughmiller et al. | |
| 2011/0238855 A1* | 9/2011 | Korsunsky | H04L 63/1441 709/231 |
| 2013/0103626 A1 | 4/2013 | Hunzinger | |
| 2014/0122398 A1 | 5/2014 | Richert | |
| 2014/0156901 A1 | 6/2014 | Raichelgauz et al. | |

(Continued)

OTHER PUBLICATIONS

International Preliminary Report on Patentability from PCT/US2017/066776 notified Jun. 25, 2020, 9 pgs.

(Continued)

*Primary Examiner* — Anhtai V Tran
(74) *Attorney, Agent, or Firm* — Essential Patents Group, LLP.

(57) ABSTRACT

Techniques and mechanisms for providing a logical state machine with a spiking neural network which includes multiple sets of nodes. Each of the multiple sets of nodes is to implement a different respective state, and each of the multiple spike trains is provided to respective nodes of each of the multiple sets of nodes. A given state of the logical state machine is implemented by configuring respective activation modes of each node of the corresponding set of nodes. The activation mode of a given node enables that node to signal, responsive to its corresponding spike train, that a respective state transition of the logical state machine is to be performed. In another embodiment, the multiple spike trains each represent a different respective character in a system used by data evaluated with the spiking neural network.

25 Claims, 7 Drawing Sheets

(56) References Cited

U.S. PATENT DOCUMENTS

2015/0046383 A1* 2/2015 Hunzinger ............. G06N 3/049
　　　　　　　　　　　　　　　　　　　　　　　　706/25
2016/0307094 A1   10/2016 Davis et al.

OTHER PUBLICATIONS

International Search Report and Written Opinion from PCT/US2017/066776 notified Sep. 12, 2018, 16 pgs.
Sipser, Michael, "Introduction to the Theory of Computation", Second Edition, Thomson Course Technology, 2006, pp. 47-62.

* cited by examiner

300

310
Coupling multiple sets of nodes of a spiking neural network to enable one or more state transitions of a logical state machine

320
Providing multiple input spike trains to the multiple sets of nodes

305

330
Providing a first state of a logical state machine with a first set of nodes of the spiking neural network, including configuring the respective modes of each node of the first set of nodes

340
During the first state, receiving at the first set of nodes an input spike train which corresponds to a node of the first set of nodes

350
In response to the input signal, providing a second state of the logical state machine with the second set of nodes, including configuring the respective modes of each node of the second set of nodes

FIG. 3

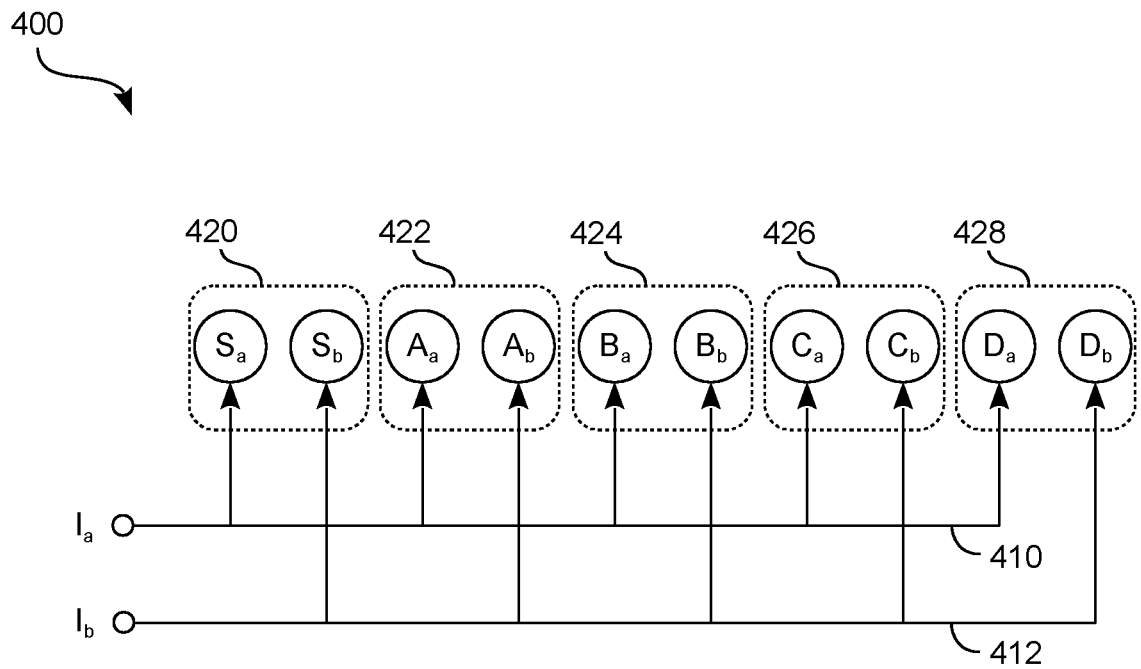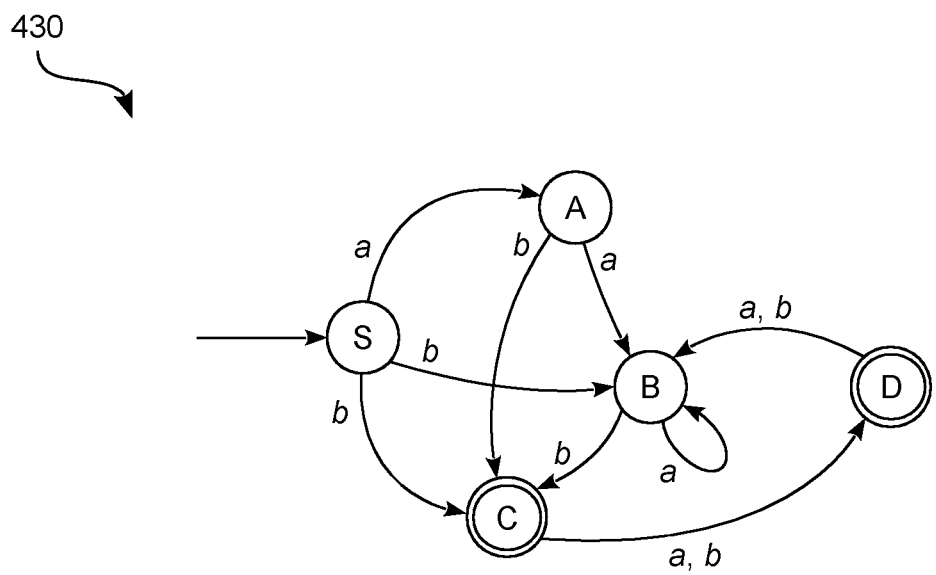
FIG. 4A

PARSING REGULAR EXPRESSIONS WITH SPIKING NEURAL NETWORKS

CLAIM OF PRIORITY

This Application is a National Stage Entry of, and claims priority to, PCT Application No. PCT/US2017/066776, filed on Dec. 15, 2017 and titled "PARSING REGULAR EXPRESSIONS WITH SPIKING NEURAL NETWORKS", which is incorporated by reference in its entirety for all purposes.

BACKGROUND

Embodiments described herein generally relate to spiking neural networks, and more particularly, but not exclusively, relate to technologies which detect for parsing regular expressions with spiking neural networks.

Spiking neural networks (or "SNNs") are increasingly being adapted to provide next-generation solutions for various applications. SNNs variously rely on signaling techniques wherein information is communicated using a time-based relationship between signal spikes. As compared to typical deep-learning architectures—such as those provided with a convolutional neural network (CNN) or a recurrent neural network (RNN)—a SNN provides an economy of communication which, in turn, allows for orders of magnitude improvement in power efficiency.

Regular expression (or "reg-ex") detection is one type of task which, conventionally, is performed by von Neumann-type processors and computer architectures, application-specific integrated circuits (ASICs), field programmable gate arrays (FPGAs) and other types of circuitry which, at least with respect to reg-ex detection, implement a somewhat fixed programming Typically, a reg-ex parser includes a static configuration of circuit logic to provide a pipeline for processing text, software or other such data. To date, SNNs have not been used to provide reg-ex search functionality.

Reg-ex detection tends to be an extremely important part of many use cases, such as scanning for computer viruses and performing document searches. As data streaming, cloud storage, cloud computing, and other such technologies continue to increase in number, capability, and variety—along with the proliferation of malware and other security threats—there is expected to be an increasing premium placed on incremental improvements to efficient solutions for performing reg-ex detection.

BRIEF DESCRIPTION OF THE DRAWINGS

The various embodiments of the present invention are illustrated by way of example, and not by way of limitation, in the figures of the accompanying drawings and in which:

FIG. 3 is a flow diagram illustrating a method to provide a logical state machine with a spiking neural network according to an embodiment.

FIGS. 4A, 4B shows various diagrams each illustrating features of a spiking neural network to provide a state machine according to an embodiment.

DETAILED DESCRIPTION

Figure 1:
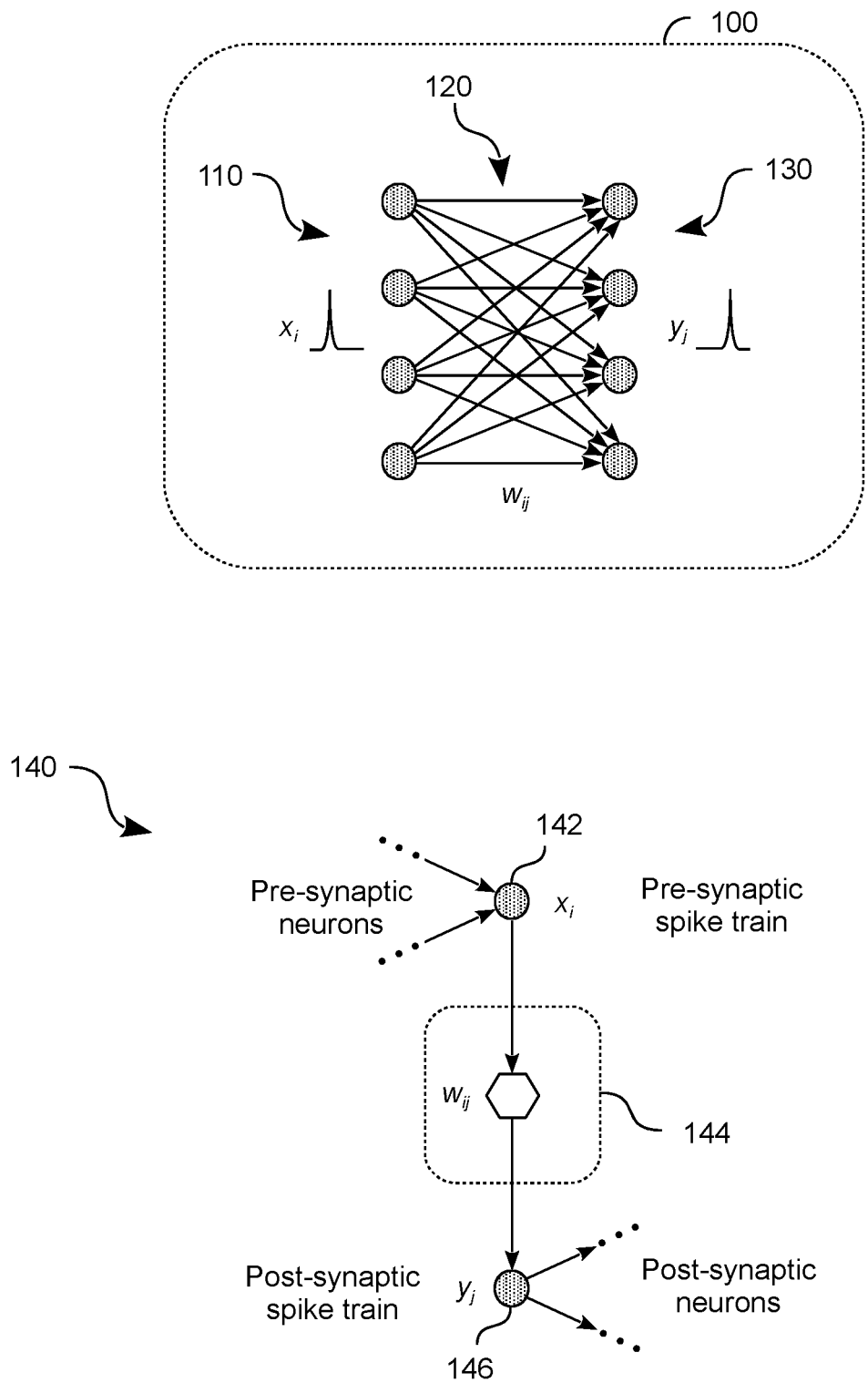
FIG. 1 shows diagrams each illustrating features of a simplified spiking neural network according to an embodiment.

Embodiments discussed herein variously provide techniques and mechanisms for providing a logical state machine with a spiking neural network. As used herein, "logical state machine" refers herein to a set of logical states in combination with state transitions which are each between a respective two such logical states. A logical state machine may be implemented with hardware—which may be considered a corresponding "physical" state machine—that includes or otherwise provides a spiking neural network comprising multiple sets of nodes (or "neurons"). At a given time, a configuration of the spiking neural network may implement at least one (logical) state of the logical state machine. Responsive to input signaling, the spiking neural network may implement a transition from that configuration to another configuration which implements a next one or more states of the logical state machine.

Nodes of such a spiking neural network may be of a Leaky Integrate-and-Fire (LIF) type—e.g., wherein, based on one or more spiking signals received at a given node j, the value of a membrane potential $v_m$ of that node j may spike and then decay over time. The spike and decay behavior of such a membrane potential $v_m$ may, for example, be according to the following:

$$\tau_m \left( \frac{dv_m}{dt} \right) \propto -(v_m - v_{rest}) + w_{ij} \cdot I_{ij} + J_b, \qquad (1)$$

where $w_{rest}$ is a resting potential toward which membrane potential $v_m$ is to settle, $\tau_m$ is a time constant for decay of $v_m$, $w_{ij}$ is a weight assigned to a synapse coupled between another node i and node j, $I_{ij}$ is a spiking signal (or "spike train") communicated to node j via said synapse, and $J_b$ is a value that, for example, is based on another signal provided to node j from some other external node/source. In some embodiments, $J_b$ may be based on an input spike train which, for example, represents one or more characters of a data set which is under evaluation using the spiking neural network.

The respective values of $\tau_g$, $\tau_m$, $V_{threshold}$ and/or other such parameters may be so chosen that the corresponding signals have decay characteristics which facilitate logic state transitions as described herein—e.g., so that a given node j is to output a spike only if it receives two spikes in two consecutive time periods. Due to the time constant parameters for a given post-synaptic node j, pre-synaptic spikes that are far apart in time—e.g., where two such spikes are separated by one or more time periods—may be insufficient to cause the $v_m$ of the post-synaptic node j to exceed its $V_{threshold}$. In one example embodiment, a rate of decay of $v_m$ may result in a majority of $v_m$ at a first time period decaying within three to four subsequent time periods (each of the same duration as the first time period).

By way of illustration and not limitation, a spike of $v_m$ (due, for example, to signaling from another node i) may result in an accumulated potential at node j which leaks away somewhat quickly—e.g., unless node j detects, soon afterward (e.g., a next time period), an additional signal spike in some other received spike train. Such an additional signal spike may result in a corresponding increase of $v_m$ which, in turn, may result in a corresponding spike of the signal which is output from node j. For example, membrane potential $v_m$ may spike above the threshold potential $V_{threshold}$—and the post-synaptic node j may output a corresponding signal spike—only when pre-synaptic spikes are received in two successive time periods.

Such a spiking neural network may be coupled and/or otherwise configured to provide a logical state machine that, for example, is to detect for one or more regular expressions in a given set of data. Some embodiments are not limited to a particular logical state machine, a particular regular expression, or a particular technique for identifying a specific logical state machine to be implemented with a spiking neural network. For example, the logical state machine may be provided a priori or otherwise predetermined—e.g., using conventional techniques for identifying a particular logical state machine based on a given one or more regular expressions to be detected.

In an embodiment, the logical state machine includes a set $\Gamma$ of states that may be variously implemented by the spiking neural network at different times. The logical state machine may facilitate the detection of whether (or not) data under evaluation includes some predetermined one or more regular expressions. In this sense, the logical state machine represents or otherwise corresponds to such one or more regular expressions. The data under evaluation may use or otherwise be based on a set $\Sigma$ of characters (e.g., including letters, symbols, etc.) such as that of an alphabet, syllabary or the like. The logical state machine may further comprise a set of transition rules $\chi=\{\tau_1, \tau_2, \ldots\}$, where each rule $\tau_i$ specifies a transition from a respective current state of $\Gamma$ to a respective next state of $\Gamma$.

In such an embodiment, the spiking neural network may include multiple sets of nodes—e.g., wherein a total number of nodes of the multiple sets of nodes is equal to or greater than a product $|\Gamma|\cdot|\Sigma|$ of the total number of states of set $\Gamma$ and a total number of characters of set $\Sigma$. The total number of sets of the multiple sets of nodes may, for example, be equal to the total number of states of set $\Gamma$.

Each character of set $\Sigma$ may be represented by a different respective input spike train which is communicated to the multiple sets of nodes. For example, multiple input spike trains (each to represent a different respective character of set $\Sigma$) may be provided each to a respective node of each of the multiple sets of nodes. In such an embodiment, each set of nodes of the multiple sets of nodes may correspond to a different respective state of set $\Gamma$, wherein, for each such set of nodes, each node of that set of nodes corresponds to a different respective character of set $\Sigma$. As described herein, various synaptic connections between such nodes, and the respective membrane potential characteristics of such nodes, may facilitate the implementation of such a logical state machine.

Certain features of various embodiments are described herein with reference to a spiking neural network architecture which is configured to detect for the inclusion of a regular expression in a set of data. However, such description may be extended to additionally or alternatively apply to any of a variety of other evaluation processes which are performed with a spiking neural network configured to implement state transitions of a state machine, the state transitions responsive to input spike trains which each correspond to different respective data.

Moreover, certain features of various embodiments are described herein with reference to nodes which variously output, or respond to, respective instances of only a single signal spike. However, some embodiments are not limited to a particular spiking pattern that might be used to indicate a given event in the operation of a neural network node. In various embodiments, such a spiking pattern may include a predefined combination of multiple spikes, an absence of one or more signal spikes, a rate of change of signal spikes, and/or the like.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. Such devices may be portable or stationary. In some embodiments the technologies described herein may be employed in a desktop computer, laptop computer, smart phone, tablet computer, netbook computer, notebook computer, personal digital assistant, server, combinations thereof, and the like. More generally, the technologies described herein may be employed in any of a variety of electronic devices including circuit logic to provide a spiking neural network.

FIG. 1 illustrates an example diagram of a simplified spiking neural network 100, providing an illustration of connections 120 between a first set of nodes 110 (or "neurons") and a second set of nodes 130 (neurons). Some or all of a neural network (such as the simplified neural network 100) may be organized into multiple layers—e.g., including input layers and output layers. It will be understood that the simplified neural network 100 only depicts two layers and a small number of nodes, but other forms of neural networks may include a large number of variously configured nodes, layers, connections, and pathways.

Data that is provided into the neural network 100 may be first processed by synapses of input neurons. Interactions between the inputs, the neuron's synapses and the neuron itself govern whether an output is provided via an axon to another neuron's synapse. Modeling the synapses, neurons, axons, etc., may be accomplished in a variety of ways. In an example, neuromorphic hardware includes individual processing elements in a synthetic neuron (e.g., neurocore) and a messaging fabric to communicate outputs to other neurons. The determination of whether a particular neuron "fires" to provide data to a further connected neuron is dependent on the activation function applied by the neuron and the weight of the synaptic connection (e.g., $w_{ij}$) from neuron i (e.g., located in a layer of the first set of nodes 110) to neuron j (e.g., located in a layer of the second set of nodes 130). The input received by neuron i is depicted as value $x_i$, and the output produced from neuron j is depicted as value $y_j$. Thus, the processing conducted in a neural network is based on weighted connections, thresholds, and evaluations performed among the neurons, synapses, and other elements of the neural network.

In an example, the neural network 100 is established from a network of spiking neural network cores, with the neural network cores communicating via short packetized spike messages sent from core to core. For example, each neural network core may implement some number of primitive nonlinear temporal computing elements as neurons, so that when a neuron's activation exceeds some threshold level, it generates a spike message that is propagated to a fixed set of fanout neurons contained in destination cores. The network may distribute the spike messages to all destination neurons, and in response those neurons update their activations in a transient, time-dependent manner, similar to the operation of real biological neurons.

The neural network 100 further shows the receipt of a spike, represented in the value $x_i$, at neuron i in a first set of neurons (e.g., a neuron of the first set of nodes 110). The output of the neural network 100 is also shown as a spike, represented by the value $y_j$, which arrives at neuron j in a second set of neurons (e.g., a neuron of the first set of nodes 110) via a path established by the connections 120. In a spiking neural network all communication occurs over event-driven action potentials, or spikes. In an example, spikes convey no information other than the spike time as well as a source and destination neuron pair. Computations may variously occur in each a respective neuron as a result of the dynamic, nonlinear integration of weighted spike input using real-valued state variables. The temporal sequence of spikes generated by or for a particular neuron may be referred to as its "spike train."

In an example of a spiking neural network, activation functions occur via spike trains, which means that time is a factor that has to be considered. Further, in a spiking neural network, each neuron may provide functionality similar to that of a biological neuron, as the artificial neuron receives its inputs via synaptic connections to one or more "dendrites" (part of the physical structure of a biological neuron), and the inputs affect an internal membrane potential of the artificial neuron "soma" (cell body). In a spiking neural network, the artificial neuron "fires" (e.g., produces an output spike), when its membrane potential crosses a firing threshold. Thus, the effect of inputs on a spiking neural network neuron operate to increase or decrease its internal membrane potential, making the neuron more or less likely to fire. Further, in a spiking neural network, input connections may be stimulatory or inhibitory. A neuron's membrane potential may also be affected by changes in the neuron's own internal state ("leakage").

FIG. 1 also illustrates an example inference path 140 in a spiking neural network, such as may be implemented by a form of the neural network 100 or other forms of neural networks. The inference path 140 of the neuron includes a pre-synaptic neuron 142, which is configured to produce a pre-synaptic spike train $x_i$ representing a spike input. A spike train is a temporal sequence of discrete spike events, which provides a set of times specifying at which time a neuron fires.

As shown, the spike train $x_i$ is produced by the neuron before the synapse (e.g., neuron 142), and the spike train $x_i$ is evaluated for processing according to the characteristics of a synapse 144. For example, the synapse may apply one or more weights, e.g., weight $w_{xi}$, which are used in evaluating the data from the spike train $x_i$. Input spikes from the spike train $x_i$ enter a synapse such as synapse 144 which has a weight $w_{ij}$. This weight scales what the impact of the presynaptic spike has on the post-synaptic neuron (e.g., neuron 146). If the integral contribution of all input connections to a post-synaptic neuron exceeds a threshold, then the post-synaptic neuron 146 will fire and produce a spike. As shown, $y_j$ is the post-synaptic spike train produced by the neuron following the synapse (e.g., neuron 146) in response to some number of input connections. As shown, the post-synaptic spike train $y_i$ is distributed from the neuron 146 to other post-synaptic neurons.

Figure 2:
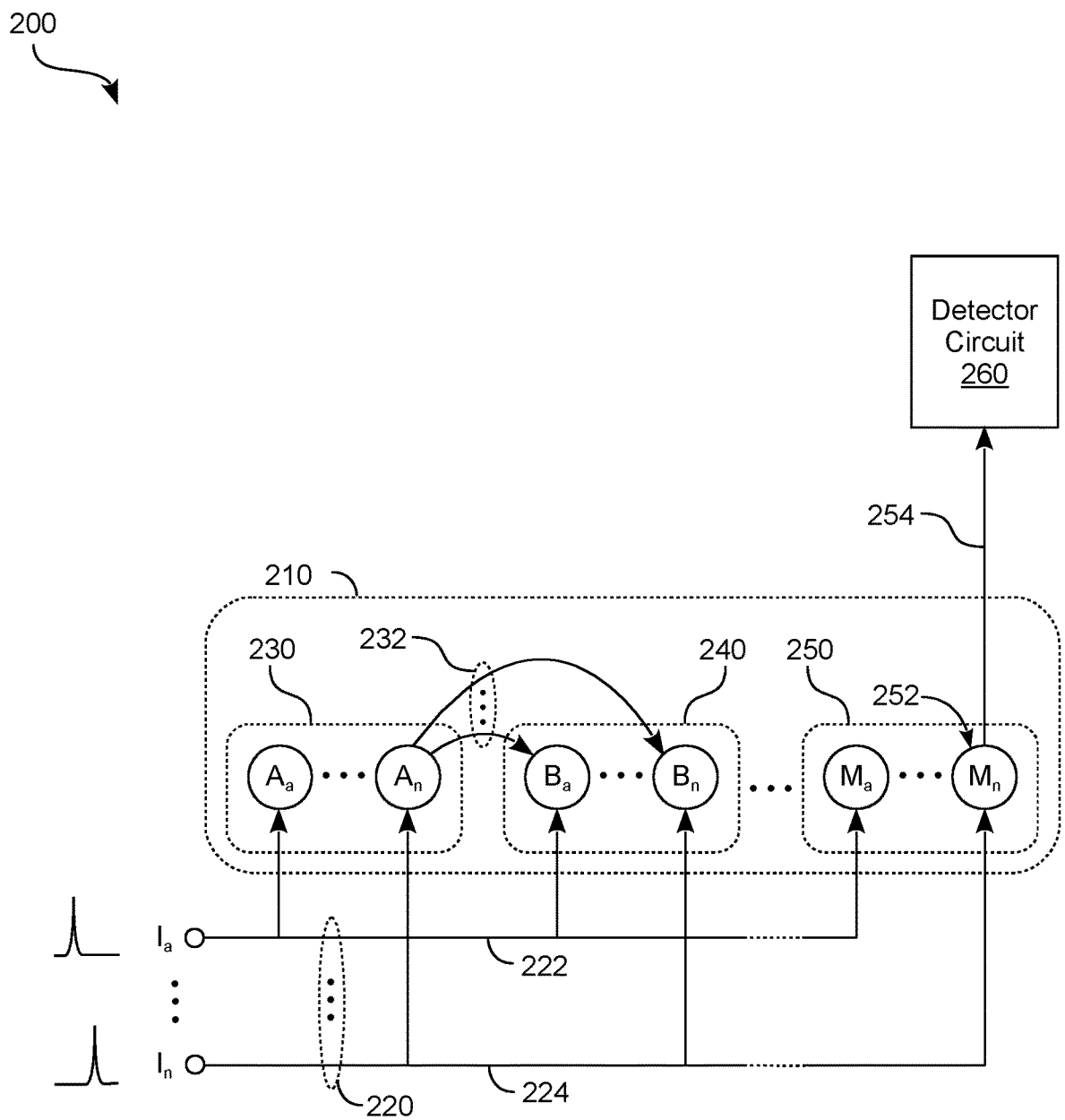
FIG. 2 is a functional block diagram illustrating features of a system to implement a logical state machine according to an embodiment.

FIG. 2 shows features of a system 200 to provide a logical state machine functionality according to an embodiment. System 200 may include some or all of the features of neural network 100. System 200 is one example of an embodiment wherein a spiking neural network is operable to successively transition between various configurations which each correspond to a different respective logical state of a logical state machine. Such state transitions may be performed in response to multiple input spike trains which are variously provided to multiple sets of nodes (or "neurons") of the spiking neural network.

In one embodiment, the multiple input spike trains provided to the spiking neural network each correspond to different respective data—e.g., wherein each input spike train corresponds to a different respective character which may be used in a set of data to be evaluated using the spiking neural network. For brevity, such a set of data is referred to herein as "data under evaluation." Spiking by a given input spike train may be used to indicate instances of a corresponding character in the data under evaluation. For example, a particular spiking pattern of an input spike train (e.g., the spiking pattern including at least one signal spike) may represent an encoded version of one instance of a corresponding character. Accordingly, a relative timing of spiking by the multiple input spike trains may represent a sequential order of characters in the data under evaluation.

The multiple sets of nodes of the spiking neural network may each correspond to a different respective (logical) state of the logical state machine. Providing such a state with a corresponding set of nodes (or, for brevity, "node set") may include all nodes of that set of nodes being configured each in a respective mode which, for brevity, is referred to herein as an "activation mode." An activation mode of a given node may enable that node to perform a particular type of signaling in response to a corresponding input spike train which is provided to that node. While in its respective activation mode, a given node may be operable to signal (responsive to its corresponding input spike train) that at least one next state of the logical state machine is to be configured. For example, the node may signal that, for at least one of the sets of nodes, each node of that set of nodes is to have its respective activation mode configured. The node which sends such signaling may then transition from its activation mode, to at least temporarily disable such signaling in response to its corresponding input spike train. However, in some embodiments the node may remain in its activation mode or may signal a reconfiguration of its own activation mode—e.g., wherein the node signals that the spiking neural network is to continue implementing, or is to return to, the same logical state which is implemented in part with that same node's activation mode.

Referring now to the example embodiment of system 200, a spiking neural network 210 thereof may comprise nodes which are to be variously configured, at different times, to sequentially provide successive state transitions of a logical state machine. Such state transitions may be performed in response to input spike trains $I_a, \ldots, I_n$ which, for example, are variously communicated to nodes of spiking neural network 210 via signal lines 220. Input spike trains $I_a, \ldots, I_n$ may each correspond to different respective data—e.g., wherein input spike trains $I_a, \ldots, I_n$ are each to represent a different respective one and only one character of an alphabet, syllabary of other system used for representing text, software code or other such information. In an embodiment, nodes of spiking neural network 210 are each associated with a respective membrane potential which determines whether and/or how signals are to be communicated between nodes. The respective values of membrane potentials and/or synaptic weights of spiking neural network 210 may change over time—e.g., according to techniques described elsewhere herein.

Spiking neural network 210 may include multiple sets of nodes which are each to receive input spike trains $I_a, \ldots, I_n$. In the example embodiment shown, the multiple sets of nodes of 210 include a set 230 of nodes $A_a, \ldots, A_n$, a set 240 of nodes $B_a, \ldots, B_n$, and a set 250 of nodes $M_a, \ldots, M_n$. However, spiking neural network 210 may include more, fewer and/or differently configured sets of nodes, in other embodiments. For example, some embodiments are not limited to a particular number of the multiple sets of nodes and/or a particular number of multiple nodes within a particular set of nodes.

For each of node sets 230, 240, ..., 250, each node of the node set may be coupled to receive a different respective one of input spike trains $I_a, \ldots, I_n$—e.g., wherein signal lines 222, ..., 224 variously communicate input spike trains $I_a, \ldots, I_n$, respectively, each to respective nodes of each of node sets, 230, 240, ..., 250. A sequence of spiking patterns each by a respective one of input spike trains $I_a, \ldots, I_n$ may indicate to node sets, 230, 240, ..., 250 a sequence of characters in some data under evaluation (e.g., the data including text, software code or the like).

Node sets 230, 240, ..., 250 may each correspond to a different respective state of a logical state machine—e.g., at least insofar as a given node set is configured to selectively implement its corresponding state. For example, a first state may be implemented with node set 230 by a configuration of the respective activation modes of each of the nodes $A_a, \ldots, A_n$. The first state (for example) may be an initialization state of spiking neural network 210—e.g., where the initialization state is configured independent of input spike trains $I_a, \ldots, I_n$ by one or more initialization signals communicated using signal lines 220 or some other signal path (not shown). Alternatively, the first state may be a result of an earlier state transition of the logical state machine.

In one such embodiment, state transitions from the first state may be variously enabled each with a respective one of nodes $A_a, \ldots, A_n$. For example, the first state may include the activation mode of node $A_a$ enabling a state transition in response to a particular spiking pattern of input spike train $I_a$, the spiking pattern indicating an instance of the character to which input spike train $I_a$ corresponds. The first state may further include the activation mode of node $A_n$ enabling a state transition in response to a particular spiking pattern of input spike train $I_n$, the spiking pattern indicating an instance of another character to which input spike train $I_n$ corresponds. Any other node of nodes $A_a, \ldots, A_n$ may be similarly configured to signal a respective state transition in response to a corresponding one of input spike trains $I_a, \ldots, I_n$.

An illustration of one such state transition is described below with reference to node $A_n$ implementing, in response input spike train $I_n$, a transition from the first state to a second state which, for example, is provided with node set 240. For example, as shown in FIG. 2 spiking neural network 210 may include synapses 232 each coupled between node $A_n$ and a different respective one of nodes $B_a, \ldots, B_n$ of node set 240. In such an embodiment, each node of node set 240 may be coupled to node $A_n$ by a respective one of synapses 232. In an example scenario according to one embodiment, a signal spike pattern of input spike train $I_n$ may indicate, during the first mode (and thus, during the activation mode of node $A_n$), an instance of a character or other data which, of input spike trains $I_a, \ldots,$ $I_n$, corresponds only to input spike train $I_n$. In response to the signal spike pattern, node $A_n$ may signal that spiking neural network 210 is to transition from implementing one or more states of the logical machine (including the first state implemented with node set 230) to implementing one or more next states of the logical state machine. For example, node $A_n$ may signal via synapses 232 that each of nodes $B_a, \ldots, B_n$ is to transition to a respective activation mode. In an embodiment where the first state is not one of the one or more next states of the logical state machine, nodes $A_a, \ldots, A_n$ may transition away from their respective activation modes.

It is noted that if nodes $B_a, \ldots, B_n$ each receive a respective signal spike from node $A_n$ during a time period (t−1), and a signal spike of spike train $I_b$ is communicated to B. (but not any other node of node set 240) at a next time period t, then of all nodes Ba, ..., B. of node set 240, only node $B_n$ may output signaling to implement a next one or more states of the logical state machine. Such selective signaling by only node $B_n$ may result from a failure of any other node of node set 240 to reach a respective threshold membrane voltage level (i.e., in the absence of that any other node receiving during time period t a signal spike via a corresponding input spike train).

In such an embodiment, spiking neural network 210 may include one or more additional sets of synapses (not shown), wherein for each node of node sets 230, 240, ..., 250, a respective set of synapses couples that node to each node of at least one of node sets 230, 240, ..., 250. Accordingly, an arrangement of node sets 230, 240, ..., 250 and synapses of spiking neural network 210 may enable state transitions for any possible character being detected while any possible combination of one or more states of the logical state machine is being implemented.

For example, similar to the providing of the first state with node set 230, a second state may be implemented with node set 240 by a configuration of the respective activation modes of each of the nodes $B_a, \ldots, B_n$. During the second state, nodes $B_a, \ldots, B_n$ may be variously enabled—responsive to input spike trains $I_a, \ldots, I_n$, respectively—each to signal a respective state transition using a respective set of synapses (not shown) similar in functionality to synapses 232. Alternatively or in addition, a third state may be similarly implemented with node set 250 by a configuration of the respective activation modes of each of the nodes $M_a, \ldots, M_n$. During the third state, nodes $M_a, \ldots, M_n$ may be variously enabled—responsive to input spike trains $I_a, \ldots, I_n$, respectively—each to signal a respective state transition using a respective set of synapses (not shown).

In some embodiments, spiking neural network 210 includes or couples to circuitry which is to signal that a particular state of the logical state machine has been implemented. For example, such circuitry may indicate whether data under evaluation has satisfied (or alternatively, has failed to satisfy) some test condition. By way of illustration and not limitation, the logical state implemented by node set 250 may be a state—referred to herein as an "accept or reject state"—which corresponds to a determination that the data under evaluation does include (or alternatively, is devoid of) an instance of at least one regular expression which the logical state machine is designed to detect. In response to reaching the accept or reject state implemented with node set 250, a signal from at least one of the nodes $M_a, \ldots, M_n$ (e.g., the illustrative signal 254 from node $M_n$ 252) may be sent to a detector circuit 260 which is included in or coupled to system 200. In response to signal 254, detector circuit 260 may perform or otherwise facilitate additional processing to implement an acceptance (or alternatively, a rejection) of the data under evaluation.

FIG. 3 shows features of a method 300 to implement a logical state machine with a spiking neural network according to an embodiment. Method 300 is one example of an embodiment wherein a state of the state machine is configured using one of multiple sets of nodes of a spiking neural network—e.g., wherein another state of the state machine may be configured using another of the multiple sets of nodes. A transition from one such state to another state may be signaled by multiple spike trains which are communicated to each of multiple sets of nodes of the spiking neural network. In an embodiment, some or all of method 300 is performed by one of spiking neural networks 100, 210.

Although some embodiments are not limited in this regard, method 300 may include one or more operations to provide, configure, or otherwise enable functionality of a spiking neural network for subsequent operation to implement a logical state machine. For example, method 300 may comprise, at 310, coupling multiple sets of nodes of a spiking neural network to enable one or more state transitions of a logical state machine. For each set of nodes of the multiple sets of nodes, each node of the set of nodes may be coupled to configure a different respective one and only one state of the logical state machine. Based on the coupling at 310, the spiking neural network may be configured to perform state transitions of the logical state machine to detect whether data under evaluation includes a regular expression. Such regular expression may include, for example, a particular string of human-readable text, a signature of malware (e.g., software virus) and/or the like.

The coupling at 310 may include coupling various nodes of the spiking neural network each to receive a respective input spike train of multiple input spike trains. Alternatively or in addition, the coupling at 310 may include coupling synapses each between respective pairs of node of the spiking neural network. In some embodiments, the coupling at 310 includes determining weight values which are variously associated with respective ones of such synapses. In an embodiment, the coupling at 310 may result in a configuration which disables any signaling to implement at least some types of state transitions. For example, a given two nodes X and Y of the spiking neural network may remain only indirectly coupled to one another, the spiking neural network being devoid of any synapse which is directly coupled to both node X and node Y. In an alternative embodiment wherein a synapse is directly coupled to both node X and node Y, a weight value may be assigned to that synapse to preclude the possibility that any signaling via the synapse might result in one of nodes X, Y transitioning to a respective activation mode. For example, assigning the weight value may include selecting a weight value that fails to satisfy a criteria for recognizing an activation mode transition event. Such selecting may be between only two possible (binary) weight values—e.g., the one weight value which fails to satisfy the criteria and another weight value that satisfies the criteria.

Method 300 may additionally or alternatively comprise, at 320, providing multiple input spike trains to the multiple sets of nodes. The multiple input spike trains may each correspond to different respective data—e.g., wherein the input spike trains each represent a corresponding one and only one character of an alphabet, syllabary or other character system used by the data under evaluation. For each input spike train of the multiple input spike trains, a respective spiking pattern of the input spike train may indicate an instance of the corresponding character in the data under evaluation.

Alternatively or in addition, method 300 may include operations 305 to implement at least in part a logical state machine with a spiking neural network based on the coupling at 310 and/or the providing at 320. For example, operations 305 may include, at 330, providing a first state of a logical state machine with a first set of nodes of the spiking neural network, wherein multiple sets of nodes of the spiking neural network include the first set of nodes and a second set of nodes. For each set of nodes of the multiple sets of nodes, each node of the set of nodes may correspond to (e.g., be coupled to receive) a different respective input spike train of multiple input spike trains. Additionally or alternatively, for each node of the multiple sets of nodes, a respective mode (an "activation mode") of the node may enable the node to configure a respective state of the logical state machine with a respective set of nodes of the multiple sets of nodes. Each such node may be operable to enable a respective next one or more states of the logical state machine, where such enabling is in response to the corresponding input spike train provided to that node. The providing the first state at 330 may, for example, include configuring the respective modes of each node of the first set of nodes. In such an embodiment, each state of the logical state machine may correspond to a different respective set of nodes of the multiple sets of nodes, wherein, for each state of the logical state machine, the state includes a configuration of the respective modes of each node of the corresponding set of nodes.

Operations 305 may further comprise, at 340, receiving at the first set of nodes, during the first state of the logical state machine, an input spike train which corresponds to a node of the first set of nodes. A spiking pattern of the input spike train received at 340 may indicate an instance, in the data under evaluation, of a character to which that input spike train corresponds. In response to the receiving at 340, operations 305 may further perform, at 350, providing a second state of the logical state machine with the second set of nodes, including configuring the respective modes of each node of the second set of nodes. During the second state, each node of the second set of nodes may be ready to signal, responsive to a corresponding one of the multiple input spike trains, that a corresponding next one or more states of the logical state machine are to be implemented.

Although some embodiments are not limited in this regard, operations 305 may further comprise an additional one or more processes (not shown) that, for example, enable the logical state machine to be a non-deterministic finite automaton (NFA). The non-deterministic nature of the logical state machine may be provided, at least in part, by enabling two or more of the multiple states to be implemented concurrently with each other. For example, operations 305 may further include, in response to receiving the input spike train at 340, providing a third state of the logical state machine with a third set of nodes of the multiple sets of nodes. Providing the third state may include configuring the respective modes of each node of the third set of nodes—e.g., wherein the third state is configured concurrently with the second state. During this concurrent configuration, each node of the second set of nodes and each node of the third set of nodes may be ready to signal, responsive to a corresponding one of the multiple input spike trains, that a corresponding next one or more states of the logical state machine are to be implemented.

In an embodiment, operations 305 may include additional processes (not shown) to implement one or more other state transitions subsequent to (or prior to) the second state being provided at 350. For example, such additional processes may include receiving another one of the multiple spike trains at another node of the first set of nodes, where said receiving is during some later (or alternatively, earlier) instance of the first state being implemented with the first set of nodes. In response a spiking pattern of this other input spike train, the receiving node of the first set of nodes may signal that the respective modes of at least the other nodes of the first set of nodes are to be reconfigured or maintained. Accordingly, the first state may be continued (or reasserted) as one of the one or more next states which are to follow from a current instance of the first state.

In some embodiments, method 300 comprises configuring an initialization state of the spiking neural network, including configuring the respective modes of each node of one of the multiple sets of nodes. In such an embodiment, the configuring of the initialization state may be independent of any of the multiple input spike trains. The initialization state may be an instance of the first state, for example, such as one provided at 330. Alternatively, the initialization state may be an earlier instance of the first state (or another state of the logical state machine) which precedes the providing at 330.

In some embodiments, at least one set of nodes of the multiple sets of nodes includes a node that outputs a signal (such as signal 254) indicating whether or not a test criteria has been satisfied. For example, each node of the set of nodes may output a respective signal indicating whether the test criteria has been satisfied. The test criteria may include, for example, the search criteria for detecting a string of characters or other such regular expression of data under evaluation.

Figure 4B:
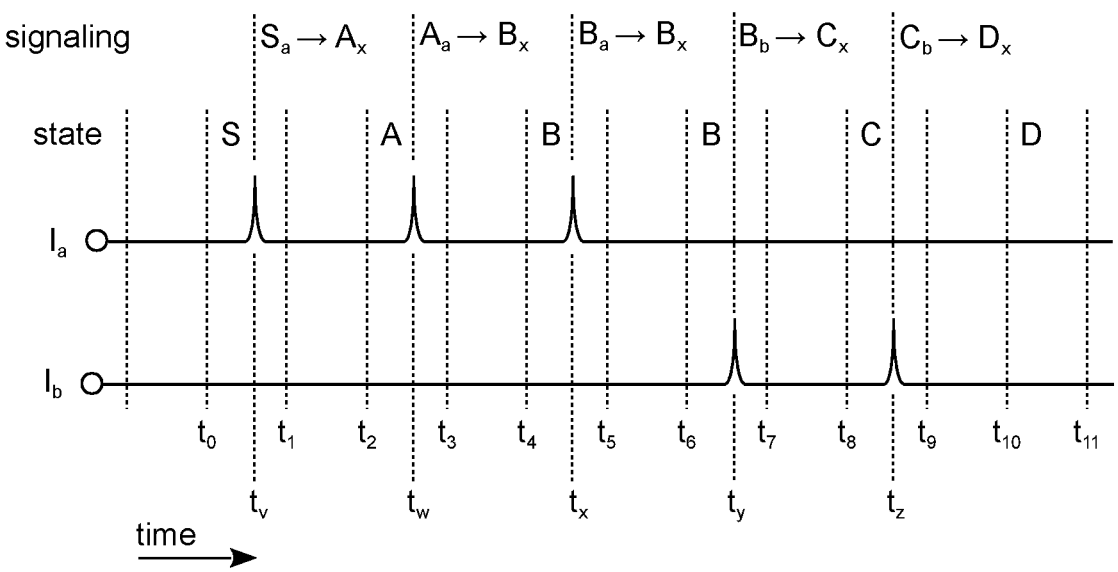

FIGS. 4A, 4B shows features of a spiking neural network 400 to perform state transitions of a logical state machine according to an embodiment. Spiking neural network 400 may include features of one of spiking neural networks 100, 210, for example. Spiking neural network 400 is one example of an embodiment to implement logical states each with a different respective set of network nodes, and to variously implement state transitions each in response to a respective input spike train. Implementing one or more such states and/or state transitions may include operations of method 300, in some embodiments.

As shown in FIG. 4, spiking neural network 400 may comprise multiple sets of nodes including, for example, the illustrative set 420 of nodes $S_a$, $S_b$, the set 422 of nodes $A_a$, $A_b$, the set 424 of nodes $B_a$, $B_b$, the set 426 of nodes $C_a$, $C_b$, and the set 428 of nodes $D_a$, $D_b$. Node sets 420, 422, 424, 426, 428 may be variously coupled each to receive multiple input spike trains—e.g., including the illustrative spike trains $I_a$, $I_b$ shown. For example, nodes $S_a$, $A_a$, $B_a$, $C_a$, $D_a$ may each be coupled via a signal line 410 to receive spike train $I_a$, where nodes $S_b$, $A_b$, $B_b$, $C_b$, $D_b$ are each coupled via a signal line 412 to receive spike train $I_b$. Input spike trains $I_a$, $I_b$ may correspond functionally to input spike trains $I_a$, ..., $I_n$, in one embodiment—e.g., where node sets 420, 422, 424, 426, 428 correspond functionally to node sets 230, 240, ..., 250 and signal lines 410, 412 correspond functionally to signal lines 222, ..., 224.

FIG. 4A also shows one example of a logical state machine 430 that may be implemented with spiking neural network 400. In the example embodiment shown, logical state machine 430 includes states S, A, B, C and D (e.g., wherein state S is an initialization state) and various state transitions each between a respective two of states S, A, B, C and D. In some embodiments, one or more states of logical state machine 430 may be accept or reject states—e.g., wherein implementation of either state C or state D may result in a signal indicating a result of processing to detect for a regular expression in data under evaluation.

A given state transition may be variously performed, for example, in response to a particular spiking pattern of one of spiking input spike trains $I_a$, $I_b$ during a current one or more states of the state machine. By way of illustration and not limitation, a transition from state S to state A may be performed in response to input spike train $I_a$ indicating an instance of a character a in the data under evaluation. Alternatively or in addition, a transition from state S to state B may be performed in response to input spike train $I_b$ indicating an instance of a character b in the data under evaluation. The particular states and state transitions of logical state machine 430, the particular number of spike trains $I_a$, $I_b$ and the particular number, sizes and configurations of node sets 420, 424, 424, 426, 428 are merely illustrative, and are not limiting on other embodiments.

Spiking neural network 400 may further comprise synapses (not shown in FIG. 4A) which variously couple each nodes of node sets 420, 422, 424, 426, 428 to a respective one or more of node sets 420, 422, 424, 426, 428. The coupling of some or all such nodes with respective synapses and/or the assigning of respective weight values to some or all such synapses may enable at least in part one or more state transitions of logical state machine 430. A given state transitions of logical state machine 430 may be based on a state which is currently implemented with one of node sets 420, 424, 424, 426, 428, and further based on a concurrent spike pattern of one of spike trains $I_a$, $I_b$.

For example, FIG. 4B shows a table 440 illustrating synaptic connections between respective nodes of spiking neural network 400. The rows and columns of table 440 correspond to "driving neurons" and "driven neurons," respectively. "Driving neuron" refers to a node that is to generate signaling which results in the respective activation modes of one or more other nodes. In turn, those one or more other nodes are thereby "driven neurons," at least with respect to the driving node in question. A node may be both a driving neuron (or "driving node") with respect to one state transition and a driven neuron (or "driven node") with respect to another state transition. Alternatively or in addition, a node may be a driving node (and a driven node) of itself, in some embodiments.

In table 440, cells which include the number "1" correspond to instances where the corresponding driving node is capable of configuring the activation mode of the corresponding driven node. For example, the cell which is in row $S_a$ and in column $A_a$ has a value "1," indicating that, responsive to spike train $I_a$, node $S_a$ can signal node $A_a$ to transition to its activation mode. Similarly, the cell which is in row $S_a$ and in column $A_b$ has a value "1," indicating that, responsive to spike train $I_a$, node $S_a$ can signal node $A_b$ to transition to its activation mode. Referring again to logical state machine 430, such signaling may implement a transition from state S to state A in response to a spiking pattern of spike train $I_a$ indicating an instance of the character a.

By contrast, cells which include the number "0" correspond to instances where the corresponding driving node is prevented from configuring the activation mode of the corresponding driven node. The prevention of such configuring may be due, for example, to the absence of any synapse between the corresponding driving node and the corresponding driven node. Alternatively, prevention of this configuring may be due to a weight value which is assigned to any such synapse.

FIG. 4B also shows a timing diagram 450 which illustrates one example of how spiking neural network 400 might perform a sequence of state transitions of logical state machine 430. As shown in timing diagram 450, spiking neural network 400 may be initialized by a time $t_0$ in state S (for example)—e.g., including configuring the respective activation modes of the nodes $S_a$, $S_b$ of the corresponding node set 420. While state S is configured, the spiking neural network may begin to receive respective signal spikes of input spike trains $I_a$, $I_b$—e.g., wherein said spike trains result in a sequence of state transitions.

By way of illustration and not limitation, signal spikes of input spike train $I_a$ at respective times $t_v$, $t_w$, and $t_x$—in combination with signal spikes of input spike train $I_b$ at respective times $t_y$ and $t_z$—may indicate that data which is under evaluation by spiking neural network 400 includes the character sequence aaabb. Responsive to such signal spiking, spiking neural network 400 may perform a sequence of state transitions starting with a transition from the initialization state S. For example, responsive to the signal spike at time $t_v$, node $S_a$ may signal that each node $A_x$ of node set 422 (where "$A_x$" is used to refer to both/either of nodes $A_a$, $A_b$) is to transition to a respective activation mode to implement logical state A. The transition from state S to state A may be completed by a time $t_2$ before time $t_w$, thereby enabling nodes of node set 422 to signal the configuration of a next state transition of the sequence.

For example, responsive to the signal spike at time $t_w$, node $A_a$ may signal that each node $B_x$ of node set 424 is to transition to a respective activation mode to implement logical state B. A transition from state A to state B may thus be completed so that, by a time $t_4$ before time $t_x$, node set 424 are enabled to signal the configuration of a next state transition of the sequence. For example, responsive to the signal spike at time $t_x$, node $B_a$ may signal that each node $B_x$ of node set 424 is to maintain (or alternatively, reconfigure) a respective activation mode to again implement logical state B. The transition from state B to state B may be completed so that, by a time $t_6$ before time $t_y$, node set 424 is enabled to signal the configuration of a next state transition of the sequence.

For example, responsive to the signal spike at time $t_y$, node $B_b$ may signal that each node $C_x$ of node set 426 is to transition to a respective activation mode to implement logical state C. The transition from state B to state C may be completed so that, by a time $t_8$ before time $t_z$, node set 426 is enabled to signal the configuration of a next state transition of the sequence. For example, responsive to the signal spike at time $t_z$, node $C_b$ may signal that each node $D_x$ of node set 428 is to transition to a respective activation mode to implement logical state D. The transition from state C to state D may be completed by a time $t_{10}$, thereby enabling node set 428 to signal the configuration of any next state transition of the sequence.

In the example embodiment shown implementing logical state machine 430 includes providing a NFA. For example, an alternative signal spike sequence may include a signal spike of spike train $I_b$ which is received at spiking neural network 400 while state S of logical state machine 430 is being implemented. In such a scenario, spiking neural network 400 would transition from implementing state S with node set 420 to concurrently implementing both state B with node set 424 and state C with node set 426. For example, node $S_b$ may respond to the signal spike of spike train $I_b$ by signaling to each of nodes $B_a$, $B_b$, $C_a$ and $C_b$ that they are to transition to their respective activation modes.

The transition from state S to both state B and state C may be completed so that node sets 424, 426 are each enabled to signal the configuration of a respective next state transition of the sequence. In one such scenario, another subsequent signal spike of spike train $I_b$ may be received at spiking neural network 400 while states B and C are being implemented concurrently. In response to this subsequent signal spike, node $C_b$ of node set 426 may signal a transition from state C to state D. However, node $B_b$ of node set 424 may concurrently signal a transition from state B to state C. Accordingly, concurrent states and concurrent state transitions of a logical state machine may be variously implemented to provide non-deterministic functionality of a NFA, in some embodiments.

Figure 5:
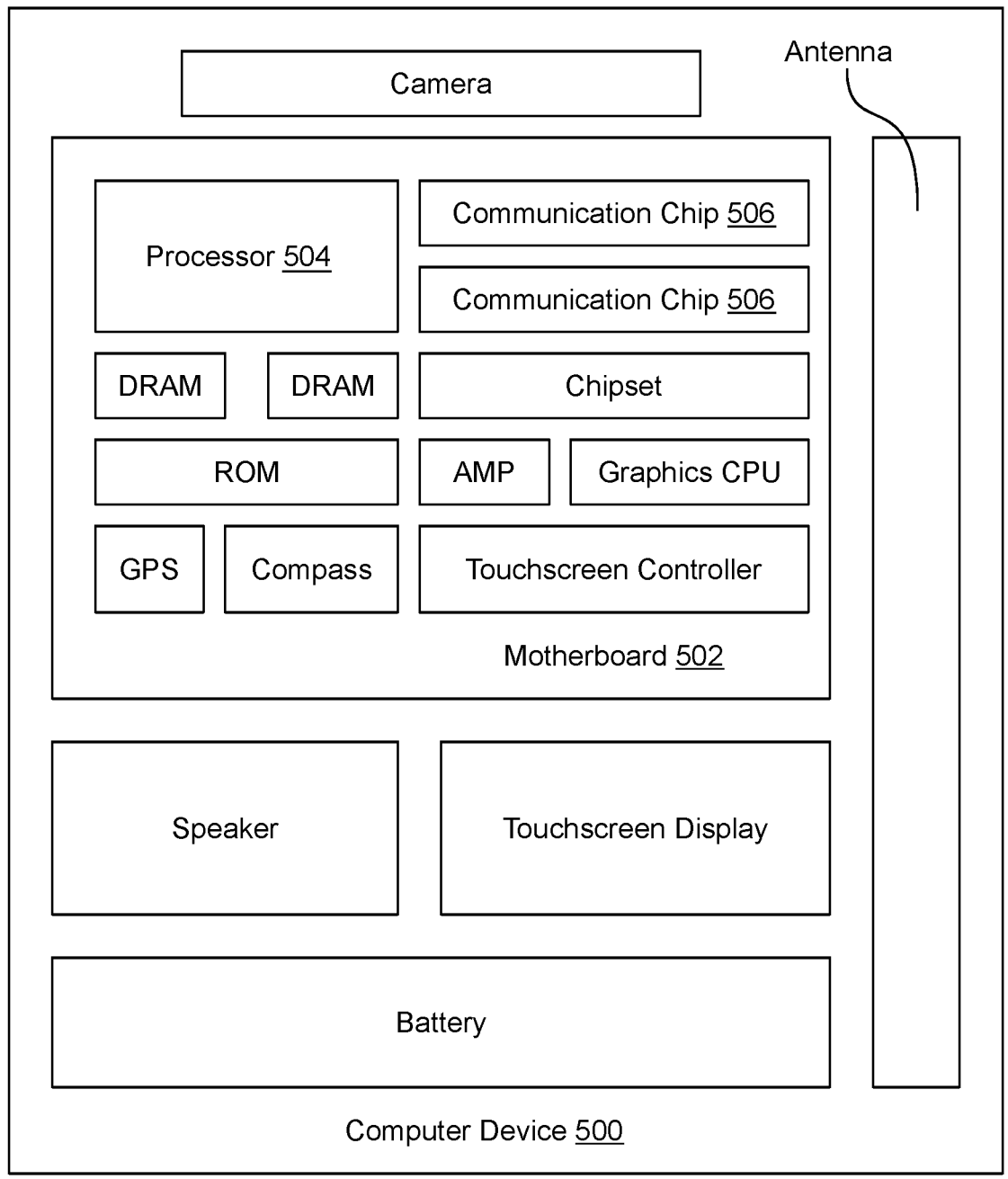
FIG. 5 is a functional block diagram illustrating a computing device in accordance with one embodiment.

FIG. 5 illustrates a computing device 500 in accordance with one embodiment. The computing device 500 houses a board 502. The board 502 may include a number of components, including but not limited to a processor 504 and at least one communication chip 506. The processor 504 is physically and electrically coupled to the board 502. In some implementations the at least one communication chip 506 is also physically and electrically coupled to the board 502. In further implementations, the communication chip 506 is part of the processor 504.

Depending on its applications, computing device 500 may include other components that may or may not be physically and electrically coupled to the board 502. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 506 enables wireless communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 500 may include a plurality of communication chips 506. For instance, a first communication chip 506 may be dedicated to shorter range wireless communications such as Wi-Fi and Bluetooth and a second communication chip 506 may be dedicated to longer range wireless communications such as GPS, EDGE, GPRS, CDMA, WiMAX, LTE, Ev-DO, and others.

The processor 504 of the computing device 500 includes an integrated circuit die packaged within the processor 504. The term "processor" may refer to any device or portion of a device that processes electronic data from registers and/or memory to transform that electronic data into other electronic data that may be stored in registers and/or memory.

The communication chip 506 also includes an integrated circuit die packaged within the communication chip 506.

In various implementations, the computing device 500 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 500 may be any other electronic device that processes data.

Some embodiments may be provided as a computer program product, or software, that may include a machine-readable medium having stored thereon instructions, which may be used to program a computer system (or other electronic devices) to perform a process according to an embodiment. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

Figure 6:
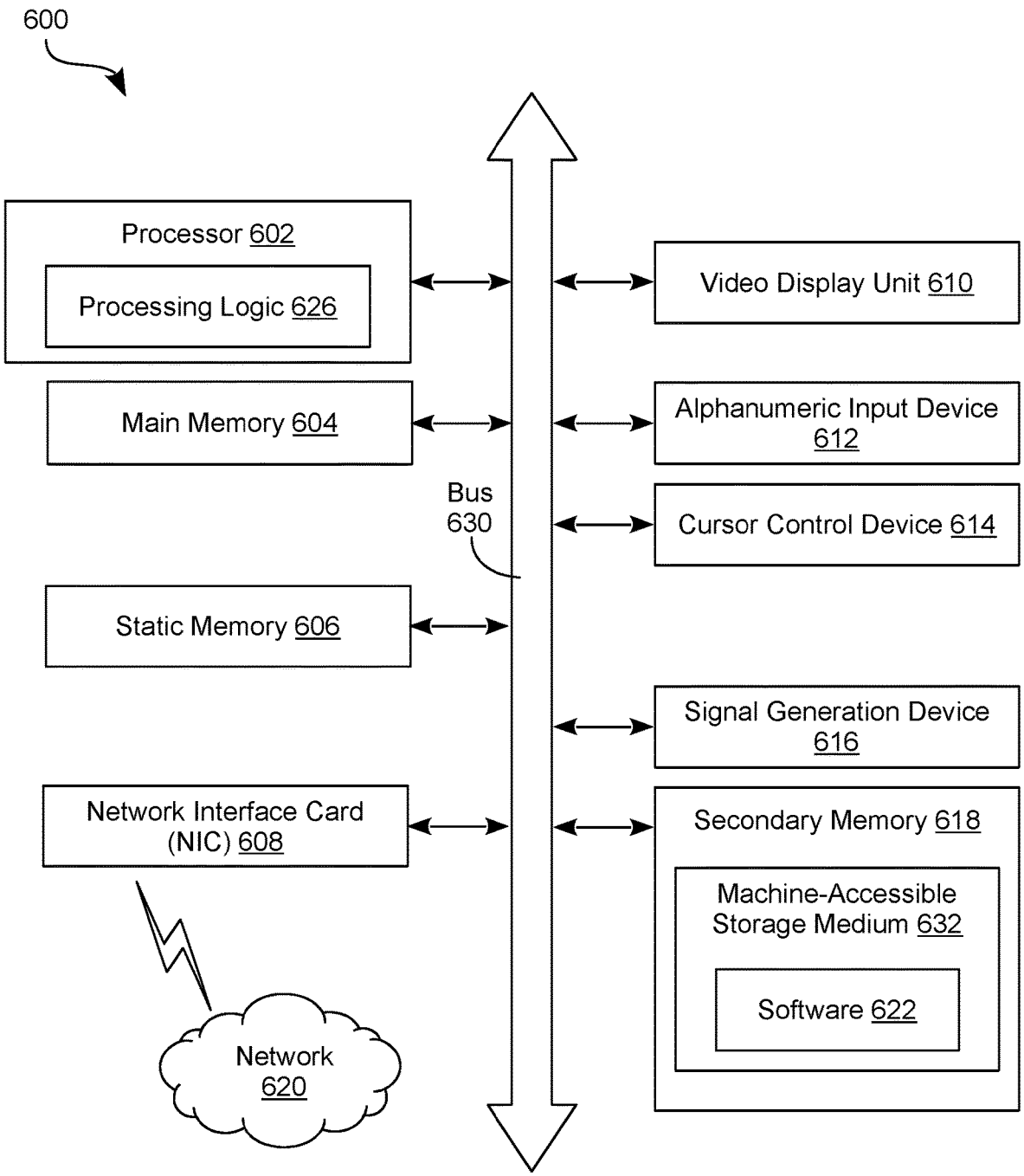
FIG. 6 is a functional block diagram illustrating an exemplary computer system, in accordance with one embodiment.

FIG. 6 illustrates a diagrammatic representation of a machine in the exemplary form of a computer system 600 within which a set of instructions, for causing the machine to perform any one or more of the methodologies described herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies described herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations described herein.

The computer system 600 may further include a network interface device 608. The computer system 600 also may include a video display unit 610 (e.g., a liquid crystal display (LCD), a light emitting diode display (LED), or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-accessible storage medium (or more specifically a computer-readable storage medium) 632 on which is stored one or more sets of instructions (e.g., software 622) embodying any one or more of the methodologies or functions described herein. The software 622 may also reside, completely or at least partially, within the main memory 604 and/or within the processor 602 during execution thereof by the computer system 600, the main memory 604 and the processor 602 also constituting machine-readable storage media. The software 622 may further be transmitted or received over a network 620 via the network interface device 608.

While the machine-accessible storage medium 632 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any of one or more embodiments. The term "machine-readable storage medium" shall accordingly be taken to include, but not be limited to, solid-state memories, and optical and magnetic media.

Example 1 is a computer device for detecting a regular expression with a spiking neural network, the computer device comprising circuitry to provide a first state of a logical state machine with a first set of nodes of a spiking neural network, wherein the logical state machine represents a regular expression to be detected, and wherein multiple sets of nodes of the spiking neural network include the first set of nodes and a second set of nodes, wherein for each set of nodes of the multiple sets of nodes, each node of the set of nodes is to correspond to a different respective input spike train of multiple input spike trains, and for each node of the multiple sets of nodes, a respective mode of the node is to enable the node to configure a respective state of the logical state machine, in response to the corresponding input spike train, with a respective set of nodes of the multiple sets of nodes. The computer device further comprises circuitry to receive at the first set of nodes, during the first state, an input spike train which corresponds to a node of the first set of nodes, and provide a second state of the logical state machine with the second set of nodes, in response to the input spike train, including circuitry to configure the respective modes of each node of the second set of nodes.

In Example 2, the subject matter of Example 1 optionally includes wherein each state of the logical state machine corresponds to a different respective set of nodes of the multiple sets of nodes, wherein, for each state of the logical state machine, the state includes a configuration of the respective modes of each node of the corresponding set of nodes.

In Example 3, the subject matter of any one or more of Examples 1 and 2 optionally includes the circuitry further to provide, in response to the input spike train being received at the first set of nodes, a third state of the logical state machine with a third set of nodes of the multiple sets of nodes, including circuitry to configure the respective modes of each node of the third set of nodes, wherein the third state is to be concurrent with the second state.

In Example 4, the subject matter of any one or more of Examples 1 through 3 optionally includes wherein, for each set of nodes of the multiple sets of nodes, each node of the set of nodes is to configure a different respective one and only one state of the logical state machine.

In Example 5, the subject matter of any one or more of Examples 1 through 4 optionally includes wherein another node of the first set of nodes is to receive another input spike train, and signal, in response the other input spike train, that the respective modes of each node of the first set of nodes are to be reconfigured or maintained.

In Example 6, the subject matter of any one or more of Examples 1 through 5 optionally includes wherein the spiking neural network is to perform state transitions of the logical state machine, each state transition to detect a respective character of the regular expression.

In Example 7, the subject matter of any one or more of Examples 1 through 6 optionally includes wherein the multiple input spike trains are each to correspond to a different respective one and only one character, wherein for each input spike train of the multiple input spike trains, a respective spiking pattern of a spike train is to indicate an instance of the corresponding character of the regular expression.

In Example 8, the subject matter of any one or more of Examples 1 through 7 optionally includes the computer device further comprising circuitry to configure an initialization state of the spiking neural network, including circuity to configure the respective modes of each node of the first set of nodes, wherein the initialization state is to be configured independent of any of the multiple input spike trains.

In Example 9, the subject matter of any one or more of Examples 1 through 8 optionally includes wherein for one set of nodes of the multiple sets of nodes, a node of the one set of nodes is to output a signal indicating that a search criteria has been satisfied, the search criteria including a string of characters.

In Example 10, the subject matter of Example 9 optionally includes wherein each node of the set of nodes is to output a respective signal indicating that the search criteria has been satisfied.

Example 11 is at least one machine readable medium including instructions that, when executed by a machine, cause the machine to perform operations for detecting a regular expression with a spiking neural network, the operations comprising providing a first state of a logical state machine with a first set of nodes of the spiking neural network, wherein the logical state machine represents a regular expression to be detected, and wherein multiple sets of nodes of the spiking neural network include the first set of nodes and a second set of nodes, wherein for each set of nodes of the multiple sets of nodes, each node of the set of nodes corresponds to a different respective input spike train of multiple input spike trains, and for each node of the multiple sets of nodes, a respective mode of the node enables the node to configure a respective state of the logical state machine, in response to the corresponding input spike train, with a respective set of nodes of the multiple sets of nodes. The operations further comprise receiving at the first set of nodes, during the first state, an input spike train which corresponds to a node of the first set of nodes, and providing a second state of the logical state machine with the second set of nodes, in response to the input spike train, including circuitry to configure the respective modes of each node of the second set of nodes.

In Example 12, the subject matter of Example 12 optionally includes wherein each state of the logical state machine corresponds to a different respective set of nodes of the multiple sets of nodes, wherein, for each state of the logical state machine, the state includes a configuration of the respective modes of each node of the corresponding set of nodes.

In Example 13, the subject matter of any one or more of Examples 11 through 12 optionally includes the operations further comprising in response to receiving the input spike train at the first set of nodes, providing a third state of the logical state machine with a third set of nodes of the multiple sets of nodes, including configuring the respective modes of each node of the third set of nodes, wherein the third state is concurrent with the second state.

In Example 14, the subject matter of any one or more of Examples 11 through 13 optionally includes wherein, for each set of nodes of the multiple sets of nodes, each node of the set of nodes is coupled to configure a different respective one and only one state of the logical state machine.

In Example 15, the subject matter of any one or more of Examples 11 through 14 optionally includes the operations further comprising, at another node of the first set of nodes, receiving another input spike train, and in response the other input spike train, signaling that the respective modes of each node of the first set of nodes are to be reconfigured or maintained.

In Example 16, the subject matter of any one or more of Examples 11 through 15 optionally includes wherein the spiking neural network performs state transitions of the logical state machine, each state transition to detect a respective character of the regular expression.

In Example 17, the subject matter of any one or more of Examples 11 through 16 optionally includes wherein the multiple input spike trains each correspond to a different respective one and only one character, wherein for each input spike train of the multiple input spike trains, a respective spiking pattern of a spike train indicates an instance of the corresponding character of the regular expression.

In Example 18, the subject matter of any one or more of Examples 11 through 17 optionally includes the operations further comprising configuring an initialization state of the spiking neural network, including configuring the respective modes of each node of the first set of nodes, the configuring the initialization state independent of any of the multiple input spike trains.

In Example 19, the subject matter of any one or more of Examples 11 through 18 optionally includes wherein for one set of nodes of the multiple sets of nodes, a node of the one set of nodes outputs a signal indicating that a search criteria has been satisfied, the search criteria including a string of characters.

In Example 20, the subject matter of Example 19 optionally includes wherein each node of the set of nodes is to output a respective signal indicating that the search criteria has been satisfied.

Example 21 is a method for detecting a regular expression with a spiking neural network, the method comprising providing a first state of a logical state machine with a first set of nodes of the spiking neural network, wherein the logical state machine represents a regular expression to be detected, and wherein multiple sets of nodes of the spiking neural network include the first set of nodes and a second set of nodes, wherein for each set of nodes of the multiple sets of nodes, each node of the set of nodes corresponds to a different respective input spike train of multiple input spike trains, and for each node of the multiple sets of nodes, a respective mode of the node enables the node to configure a respective state of the logical state machine, in response to the corresponding input spike train, with a respective set of nodes of the multiple sets of nodes. The method further comprises receiving at the first set of nodes, during the first state, an input spike train which corresponds to a node of the first set of nodes, and providing a second state of the logical state machine with the second set of nodes, in response to receiving the input spike train at the first set of nodes, including configuring the respective modes of each node of the second set of nodes.

In Example 22, the subject matter of Example 21 optionally includes wherein each state of the logical state machine corresponds to a different respective set of nodes of the multiple sets of nodes, wherein, for each state of the logical state machine, the state includes a configuration of the respective modes of each node of the corresponding set of nodes.

In Example 23, the subject matter of any one or more of Examples 21 through 22 optionally includes the method further comprising in response to receiving the input spike train at the first set of nodes, providing a third state of the logical state machine with a third set of nodes of the multiple sets of nodes, including configuring the respective modes of each node of the third set of nodes, wherein the third state is concurrent with the second state.

In Example 24, the subject matter of any one or more of Examples 21 through 23 optionally includes wherein, for each set of nodes of the multiple sets of nodes, each node of the set of nodes is coupled to configure a different respective one and only one state of the logical state machine.

In Example 25, the subject matter of any one or more of Examples 21 through 24 optionally includes the method further comprising, at another node of the first set of nodes, receiving another input spike train, and in response the other input spike train, signaling that the respective modes of each node of the first set of nodes are to be reconfigured or maintained.

In Example 26, the subject matter of any one or more of Examples 21 through 25 optionally includes wherein the spiking neural network performs state transitions of the logical state machine, each state transition to detect a respective character of the regular expression.

In Example 27, the subject matter of any one or more of Examples 21 through 26 optionally includes wherein the multiple input spike trains each correspond to a different respective one and only one character, wherein for each input spike train of the multiple input spike trains, a respective spiking pattern of a spike train indicates an instance of the corresponding character of the regular expression.

In Example 28, the subject matter of any one or more of Examples 21 through 27 optionally includes the method further comprising configuring an initialization state of the spiking neural network, including configuring the respective modes of each node of the first set of nodes, the configuring the initialization state independent of any of the multiple input spike trains.

In Example 29, the subject matter of any one or more of Examples 21 through 28 optionally includes wherein for one set of nodes of the multiple sets of nodes, a node of the one set of nodes outputs a signal indicating that a search criteria has been satisfied, the search criteria including a string of characters.

In Example 30, the subject matter of Example 29 optionally includes wherein each node of the set of nodes is to output a respective signal indicating that the search criteria has been satisfied.

Techniques and architectures for detecting a regular expression with a spiking neural network are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A computer device for detecting a regular expression with a spiking neural network, the computer device comprising circuitry to:
provide a first state of a logical state machine with a first set of nodes of a spiking neural network, wherein the logical state machine represents a regular expression to be detected, wherein multiple sets of nodes of the spiking neural network comprise the first set of nodes and a second set of nodes, wherein the first state of the logical state machine comprises respective activation modes of each of the first set of nodes, wherein a second state of the logical state machine comprises respective activation modes of each of the second set of nodes, and wherein the first set of nodes comprises a first node;
receive multiple input spike trains at the multiple sets of nodes, wherein the multiple input spike trains are to represent a string of characters to be evaluated, wherein:
for each set of nodes of the multiple sets of nodes, the set of nodes is to receive each input spike train of the multiple input spike trains, wherein the first node is to receive a first input spike train of the multiple input spike trains,
for each node of the multiple sets of nodes, a respective activation mode of the node is to enable the node to configure a respective state of the logical state machine, in response to a corresponding one of the multiple input spike trains, with a respective set of nodes of the multiple sets of nodes, and
in response to the first input spike train, the first node is to:
generate one or more output spike trains, during the first state, and
transition from a first activation mode after a communication of the one or more output spike trains from the first node;
provide the second state of the logical state machine in response to the one or more output spike trains, wherein the one or more output spike trains are to transition each node of the second set of nodes to a respective activation mode.

2. The computer device of claim 1, wherein each state of the logical state machine corresponds to a different respective set of nodes of the multiple sets of nodes, wherein, for each state of the logical state machine, the state includes a configuration of the respective activation modes of each node of the corresponding set of nodes.

3. The computer device of claim 1, further comprising circuitry to:
provide, in response to the first input spike train being received at the first node, a third state of the logical state machine with a third set of nodes of the multiple sets of nodes, including circuitry to configure the respective activation modes of each node of the third set of nodes, wherein the third state is to be concurrent with the second state.

4. The computer device of claim 1, wherein, for each set of nodes of the multiple sets of nodes, each node of the set of nodes is to configure a different respective one and only one state of the logical state machine.

5. The computer device of claim 1, wherein another node of the first set of nodes is to:
receive another input spike train of the multiple input spike trains; and
signal, in response the other input spike train, that the respective activation modes of each node of the first set of nodes are to be reconfigured or maintained.

6. The computer device of claim 1, wherein the spiking neural network is to perform state transitions of the logical state machine, each state transition to detect a respective character of the regular expression.

7. The computer device of claim 1, wherein the multiple input spike trains are each to correspond to a different respective one and only one character, wherein for each input spike train of the multiple input spike trains, a respective spiking pattern of the input spike train is to indicate an instance of the corresponding character of the regular expression.

8. The computer device of claim 1, further comprising circuitry to:
configure an initialization state of the spiking neural network, including circuitry to configure the respective activation modes of each node of the first set of nodes, wherein the initialization state is to be configured independent of any of the multiple input spike trains.

9. The computer device of claim 1, wherein for one set of nodes of the multiple sets of nodes, a node of the one set of nodes is to output a signal indicating that a search criteria has been satisfied, the search criteria including a string of characters.

10. The computer device of claim 9, wherein each node of the set of nodes is to output a respective signal indicating that the search criteria has been satisfied.

11. At least one non-transitory machine readable medium including instructions that, when executed by a machine, cause the machine to perform operations for detecting a regular expression with a spiking neural network, the operations comprising:
providing a first state of a logical state machine with a first set of nodes of the spiking neural network, wherein the logical state machine represents a regular expression to be detected, wherein multiple sets of nodes of the spiking neural network include comprise the first set of nodes and a second set of nodes, wherein the first state of the logical state machine comprises respective activation modes of each of the first set of nodes, wherein a second state of the logical state machine comprises respective activation modes of each of the second set of nodes, and wherein the first set of nodes comprises a first node;

receiving multiple input spike trains at the multiple sets of nodes, wherein the multiple input spike trains represent a string of characters to be evaluated, wherein:

for each set of nodes of the multiple sets of nodes, the set of nodes receives each input spike train of the multiple input spike trains, wherein the first node receives a first input spike train of the multiple input spike trains, for each node of the multiple sets of nodes, a respective activation mode of the node enables the node to configure a respective state of the logical state machine, in response to a corresponding one of the multiple input spike trains, with a respective set of nodes of the multiple sets of nodes, and in response to the first input spike train, the first node:
generates one or more output spike trains, during the first state, and
transitions from a first activation mode after a communication of the one or more output spike trains from the first node;

providing the second state of the logical state machine, in response to the one or more output spike trains, wherein the one or more output spike trains are to transition each node of the second set of nodes to a respective activation mode.

12. The least one non-transitory machine readable medium of claim 11, wherein each state of the logical state machine corresponds to a different respective set of nodes of the multiple sets of nodes, wherein, for each state of the logical state machine, the state includes a configuration of the respective activation modes of each node of the corresponding set of nodes.

13. The least one non-transitory machine readable medium of claim 11, the operations further comprising:
in response to receiving the first input spike train at the first node, providing a third state of the logical state machine with a third set of nodes of the multiple sets of nodes, including configuring the respective activation modes of each node of the third set of nodes, wherein the third state is concurrent with the second state.

14. The least one non-transitory machine readable medium of claim 11, wherein, for each set of nodes of the multiple sets of nodes, each node of the set of nodes is coupled to configure a different respective one and only one state of the logical state machine.

15. The least one non-transitory machine readable medium of claim 11, the operations further comprising:
at another node of the first set of nodes:
receiving another input spike train of the multiple input spike trains; and
in response the other input spike train, signaling that the respective activation modes of each node of the first set of nodes are to be reconfigured or maintained.

16. The least one non-transitory machine readable medium of claim 11, wherein the spiking neural network performs state transitions of the logical state machine, each state transition to detect a respective character of the regular expression.

17. The least one non-transitory machine readable medium of claim 11, wherein the multiple input spike trains each correspond to a different respective one and only one character, wherein for each input spike train of the multiple input spike trains, a respective spiking pattern of the input spike train indicates an instance of the corresponding character of the regular expression.

18. The least one non-transitory machine readable medium of claim 11, the operations further comprising:
configuring an initialization state of the spiking neural network, including configuring the respective activation modes of each node of the first set of nodes, the configuring the initialization state independent of any of the multiple input spike trains.

19. The least one non-transitory machine readable medium of claim 11, wherein for one set of nodes of the multiple sets of nodes, a node of the one set of nodes outputs a signal indicating that a search criteria has been satisfied, the search criteria including a string of characters.

20. The least one non-transitory machine readable medium of claim 19, wherein each node of the set of nodes is to output a respective signal indicating that the search criteria has been satisfied.

21. A computer method for detecting a regular expression with a spiking neural network, the method comprising:
providing a first state of a logical state machine with a first set of nodes of the spiking neural network, wherein the logical state machine represents a regular expression to be detected, wherein multiple sets of nodes of the spiking neural network comprise the first set of nodes and a second set of nodes, wherein the first state of the logical state machine comprises respective activation modes of each of the first set of nodes, wherein a second state of the logical state machine comprises respective activation modes of each of the second set of nodes, and wherein the first set of nodes comprises a first node;

receiving multiple input spike trains at the multiple sets of nodes, wherein the multiple input spike trains represent a string of characters to be evaluated, wherein:

for each set of nodes of the multiple sets of nodes, the set of nodes receives each input spike train of the multiple input spike trains, wherein the first node receives a first input spike train of the multiple input spike trains, for each node of the multiple sets of nodes, a respective activation mode of the node enables the node to configure a respective state of the logical state machine, in response to a corresponding one of the multiple input spike trains, with a respective set of nodes of the multiple sets of nodes, and in response to the first input spike train, the first node:
generates one or more output spike trains, during the first state, and
transitions from a first activation mode after a communication of the one or more output trains from the first node;

providing the second state of the logical state machine, in response to the one or more output spike trains, wherein the one or more output spike trains are to transition each node of the second set of nodes to a respective activation mode.

22. The method of claim 21, wherein each state of the logical state machine corresponds to a different respective set of nodes of the multiple sets of nodes, wherein, for each state of the logical state machine, the state includes a configuration of the respective activation modes of each node of the corresponding set of nodes.

23. The method of claim 21, further comprising:
in response to receiving the first input spike train at the first node, providing a third state of the logical state machine with a third set of nodes of the multiple sets of nodes, including configuring the respective activation modes of each node of the third set of nodes, wherein the third state is concurrent with the second state.

24. The method of claim 21, wherein, for each set of nodes of the multiple sets of nodes, each node of the set of nodes is coupled to configure a different respective one and only one state of the logical state machine.

25. The method of claim 21, further comprising:
- at another node of the first set of nodes:
  - receiving another input spike train of the multiple input spike trains; and
  - in response the other input spike train, signaling that the respective activation modes of each node of the first set of nodes are to be reconfigured or maintained.

* * * * *